Feb. 2, 1960 H. DICKINSON 2,923,925

MEANS AND TECHNIQUES FOR TRANSMITTING INFORMATION

Filed Aug. 20, 1954 6 Sheets-Sheet 1

HORACE DICKINSON
INVENTOR.

BY Lyon & Lyon

ATTORNEYS

MEANS AND TECHNIQUES FOR TRANSMITTING INFORMATION

Filed Aug. 20, 1954 6 Sheets-Sheet 2

HORACE DICKINSON
INVENTOR.

BY Lyon & Lyon

ATTORNEYS

HORACE DICKINSON
INVENTOR.

BY Lyon & Lyon
ATTORNEYS

MEANS AND TECHNIQUES FOR TRANSMITTING INFORMATION

Filed Aug. 20, 1954 6 Sheets-Sheet 4

HORACE DICKINSON
INVENTOR.

BY Lyon & Lyon

ATTORNEYS

Feb. 2, 1960 H. DICKINSON 2,923,925

MEANS AND TECHNIQUES FOR TRANSMITTING INFORMATION

Filed Aug. 20, 1954 6 Sheets-Sheet 5

HORACE DICKINSON
INVENTOR.

BY Lyon & Lyon
ATTORNEYS

MEANS AND TECHNIQUES FOR TRANSMITTING INFORMATION

HORACE DICKINSON
INVENTOR.

BY Lyon & Lyon
ATTORNEYS

United States Patent Office 2,923,925
Patented Feb. 2, 1960

2,923,925

MEANS AND TECHNIQUES FOR TRANSMITTING INFORMATION

Horace Dickinson, South Gate, Calif., assignor to Vapor Recovery Systems Co., Compton, Calif., a corporation of California Application August 20, 1954, Serial No. 451,253
9 Claims. (Cl. 340—204)

The present invention relates generally to improved means and techniques for transmitting information and while the invention is described herein as being incorporated in a system for indicating at a local point, the liquid level of a remotely located tank, it is understood that certain aspects of the present invention may be incorporated in other or similar systems.

Briefly, there are two systems described herein, termed system A and system B, in each of which, a train of coded pulses is developed at a remote location, representative of the liquid level in a tank; and in each of which systems, apparatus is located at a local station for decoding such train of coded pulses and to produce an intelligible indication of the liquid level in terms of feet, inches, and fractions of an inch.

Each of the two systems A and B incorporates different means whereby a desired one of a plurality of remotely located tanks may be selected and an indication produced of the liquid level of that particular tank which is selected. Apart from the particular manner and means used in which a particular tank is selected, the two systems described herein are basically the same and involve the development of a train of coded pulses at the transmitting or remote location, and the reception of such train of coded pulses at the receiving or local station for producing a readily intelligible indication of the information being, in this particular instance, a liquid level of a tank although it is understood, as indicated above, that other information could equally well be sent from the transmitting station to the receiving station.

More specifically, each of the two systems, A and B, involves the encoding and decoding of liquid level information in terms of tens of feet, feet, inches and one-eighths of inches. Such information is converted into a special form of continuous reflected binary code which includes a code of numbers having respectively a base of 10, a base of 10, a base of 12 and a base of 8. Such reflected code is special in that it is continuous. By using such special code, the liquid level sensing element need not be locked in position during the time interval in which the encoding and decoding process takes place. Indeed, if the liquid level should change during such interval, a value is decoded which generally falls within the average of liquid level variation. Another feature is that the decoding process is accomplished and the liquid level is read out only when the decoding apparatus receives a predetermined number of signals so that spurious and erroneous readings may not be indicated by the read-out device. Such information in coded form is transmitted from a remote station to a local station in the form of a series of short and long interspersed pulses, much like a telegraph code.

A general object of the present invention is, therefore, to provide systems of the character indicated above.

Another specific object of the present invention is to provide a system of this character in which a false indication is not produced should the information vary considerably during the particular time interval during which the coded impulses are being developed and decoded, the resulting indication, under such conditions, being closely related to the average of such information. For example, if the liquid level in the tank were rising or falling during the time that the train of coded pulses was being developed and decoded, the indication at the remote location would be closely related to the average liquid level during the particular time interval under consideration.

Another specific object of the present invention is to provide a system of this character which depends for its operation on the transmission and satisfactory reception of a predetermined number of pulses, either short or long ones, in intermixed fashion.

Another specific object of the present invention is to provide a system of the character mentioned in the preceding paragraph that prevents the rendering of a false indication should, for some reason or other, the pulse train contain more or less than such predetermined number of pulses.

Another specific object of the present invention is to provide a system of this character, particularly useful in indicating conditions that are subject to change in which it is not necessary to lock or maintain stationary an element whose position is responsive to such condition during that time interval in which the condition is being measured or indicated, but on the contrary, to provide a system wherein the condition responsive element, such as a float in a tank, is always free to follow changes in liquid level.

Another specific object of the present invention is to provide a system of this character using improved coding techniques that are responsible for the production of the results indicated above.

Another specific object of the present invention is to provide an improved system of this character that is capable of indicating or measuring a changing condition in terms of numbers having a different base, for example, feet having a base of 10, inches having a base of 12, and fractions of an inch having a base of 8.

Another specific object of the present invention is to provide a system of this character in which the communication link may have a limited frequency band-pass characteristic, i.e., a wide band channel is not required, due to the fact that the signals transmitted over such link are coded pulse groups and the pulsing speed is very low, allowing operation of a low grade communication channel.

Another specific object of the present invention is to provide an improved system of this character, in which the amplitude, phase, and the frequency or polarity of the train of coded pulses have substantially no effect on the intelligence, whereby characteristics of the communication link such as line resistance, voltage variations, frequency shift, and circuit mismatch have appreciably no effect on the signal within relatively large variations.

Another specific object of the present invention is to provide improved systems of this character which "fail safe" with regards to the transmission channel, an error in the signal occurring in the transmission channel resulting in no reading at the output indicator.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figures 1, 2E:
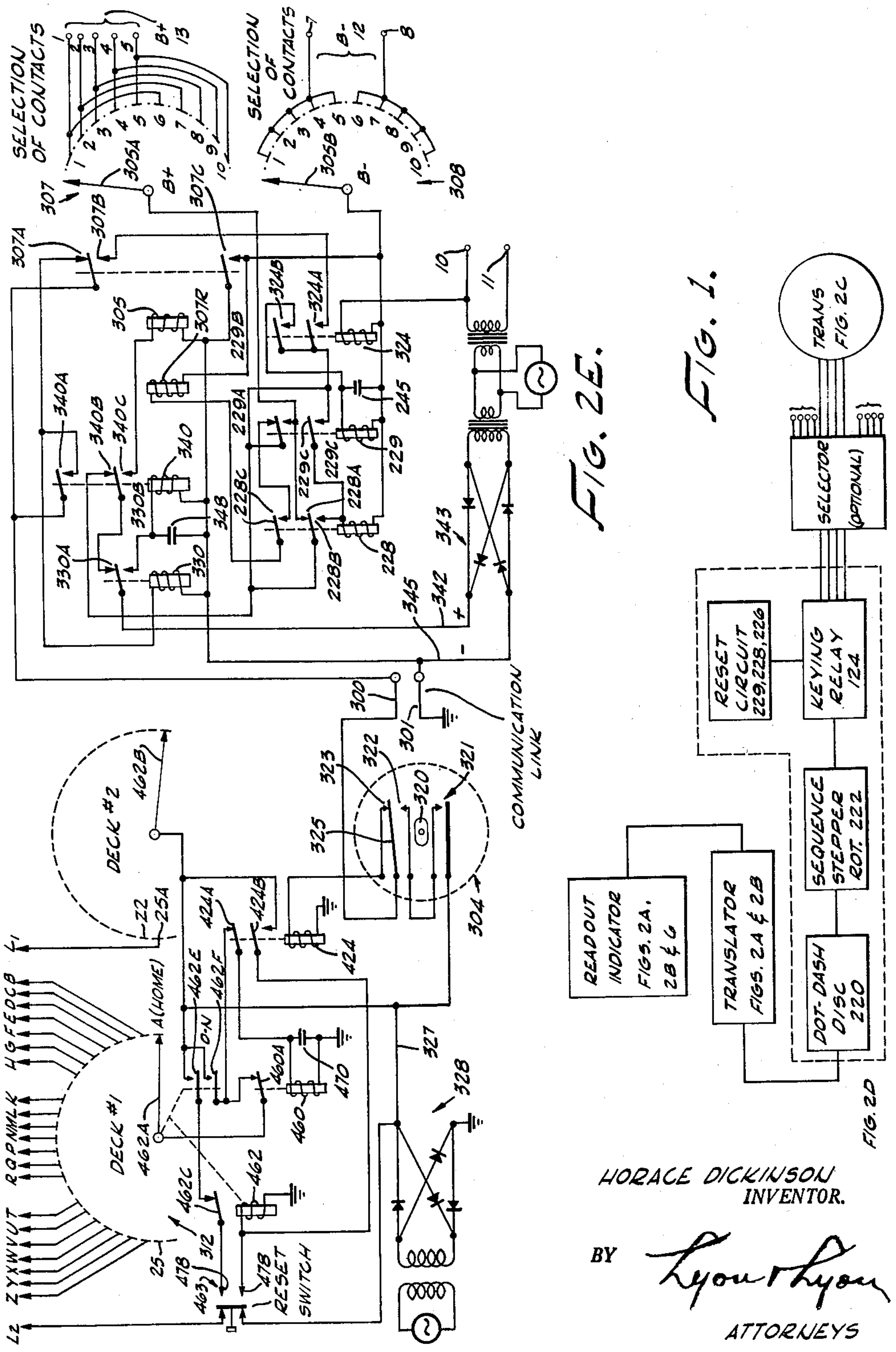
Figure 1 is a block diagram illustrating the relationship of elements in one of the two systems described herein and referred to as system A.
Figure 2E illustrates a portion of the apparatus at the receiving station used only in system B.

Figures 3 and 4 do not appear in the drawings.

Figure 5:
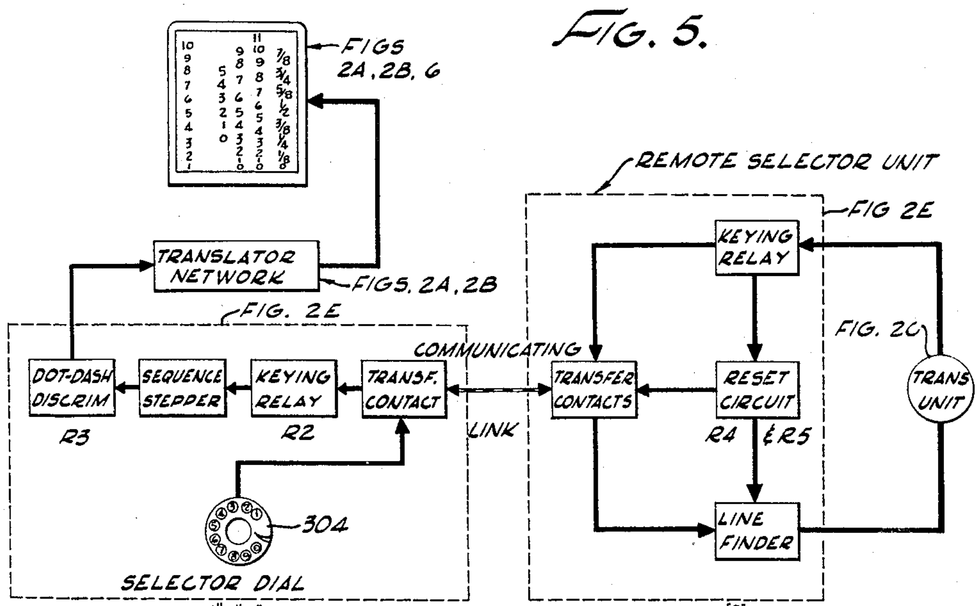

Figure 5 is a block diagram representing the elements of system B.

Figure 6:
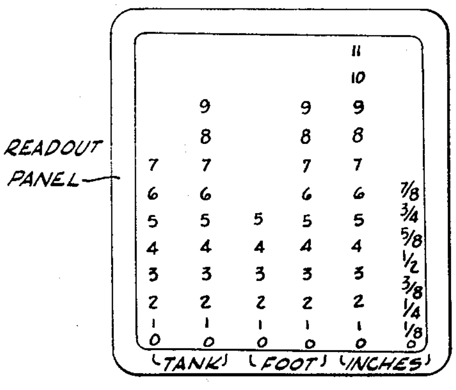

Figure 6 illustrates the form of indicator used at the receiving stage in both systems A and B.

Figures 7, 8:
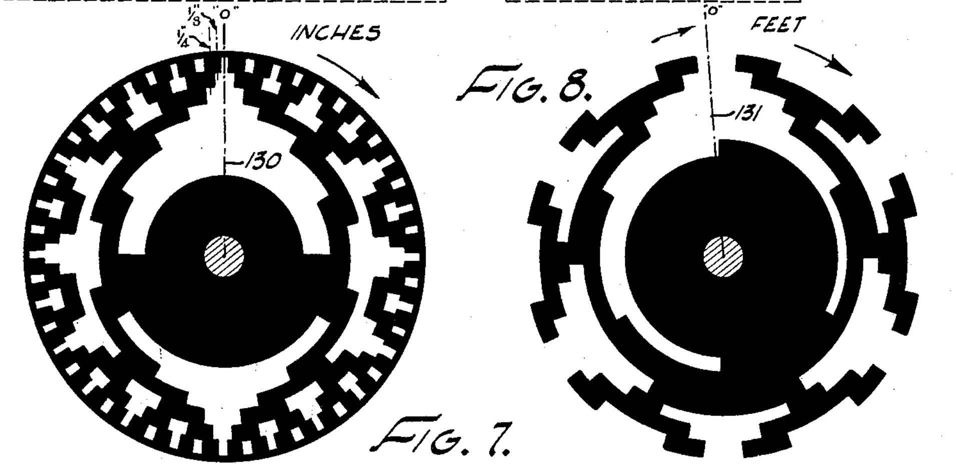

Figures 7 and 8 are plan views, respectively, of the so-called inch and so-called foot coded discs at the transmitting stage in both systems A and B.

Figure 9:
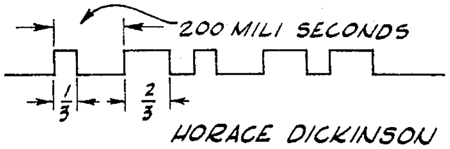

Figure 9 illustrates the timing, relative spacing and duration of the various coded pulses used in both systems A and B.

Figures 2A, 10:
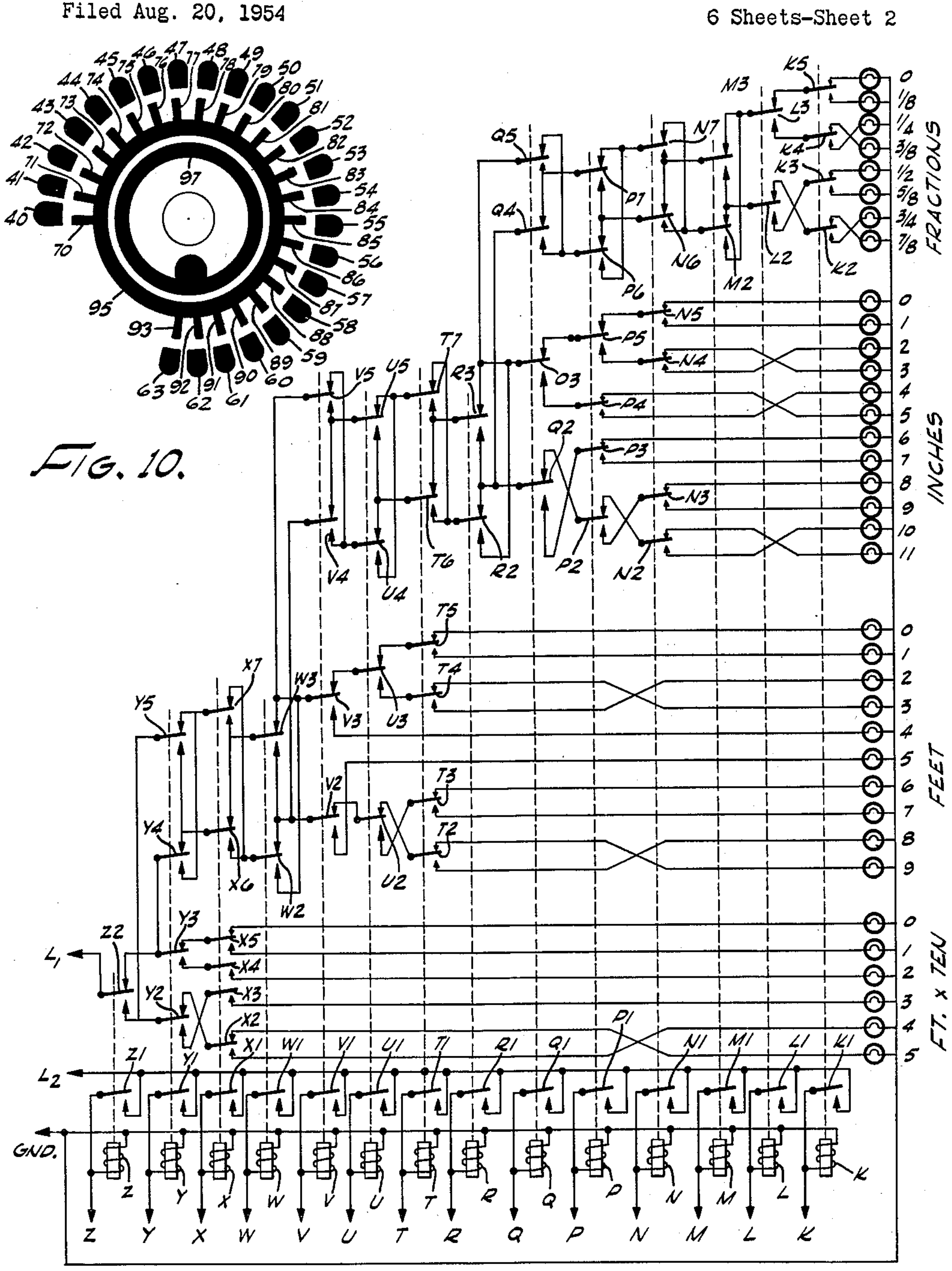
Figure 2A illustrates circuitry of a portion of the apparatus at the receiving station in the two systems described herein, referred to as system A and system B.
Figure 2B:
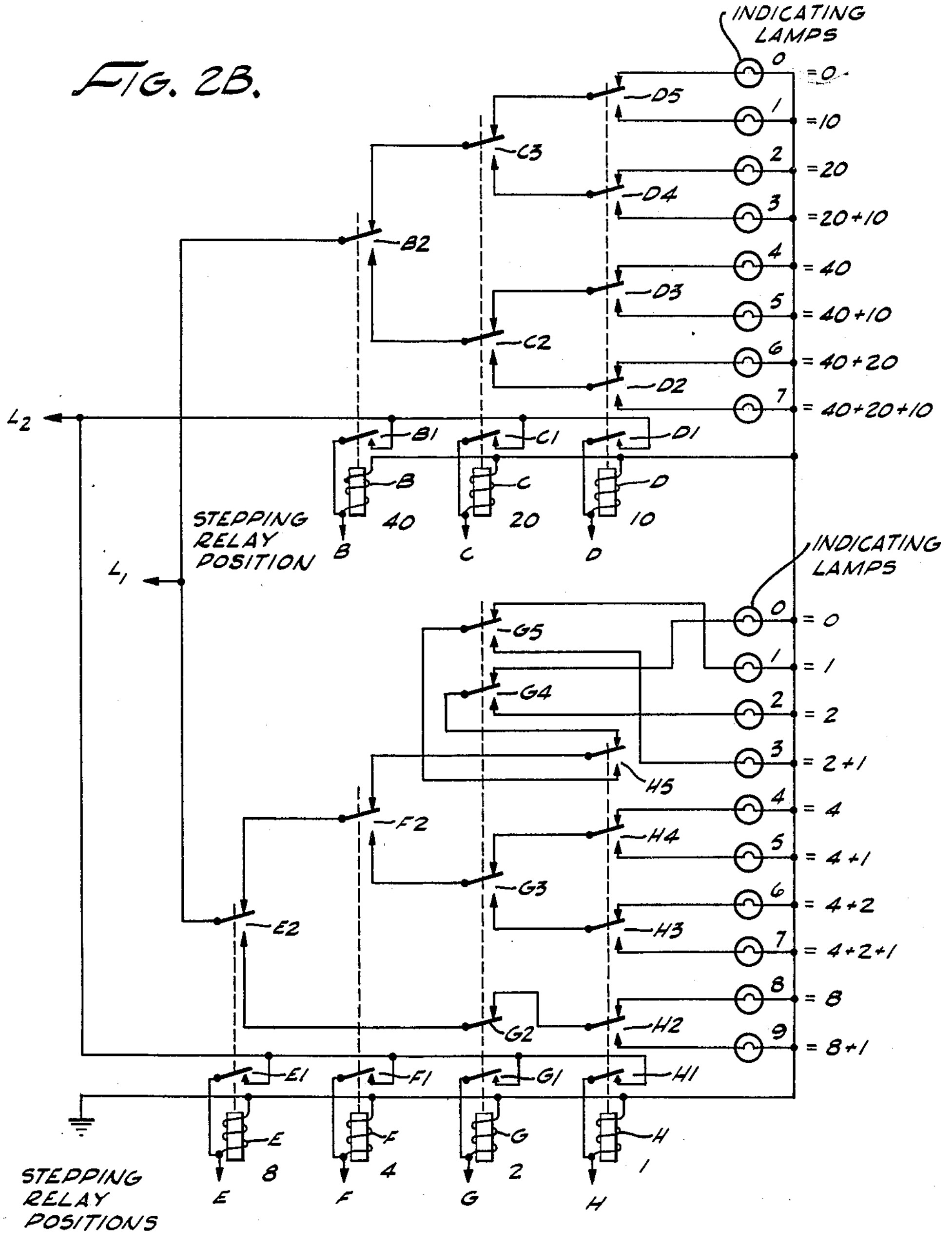
Figure 2B is a schematic of another portion of the apparatus located at the receiving station in each of the two systems, namely, system A and system B.
Figure 2C:
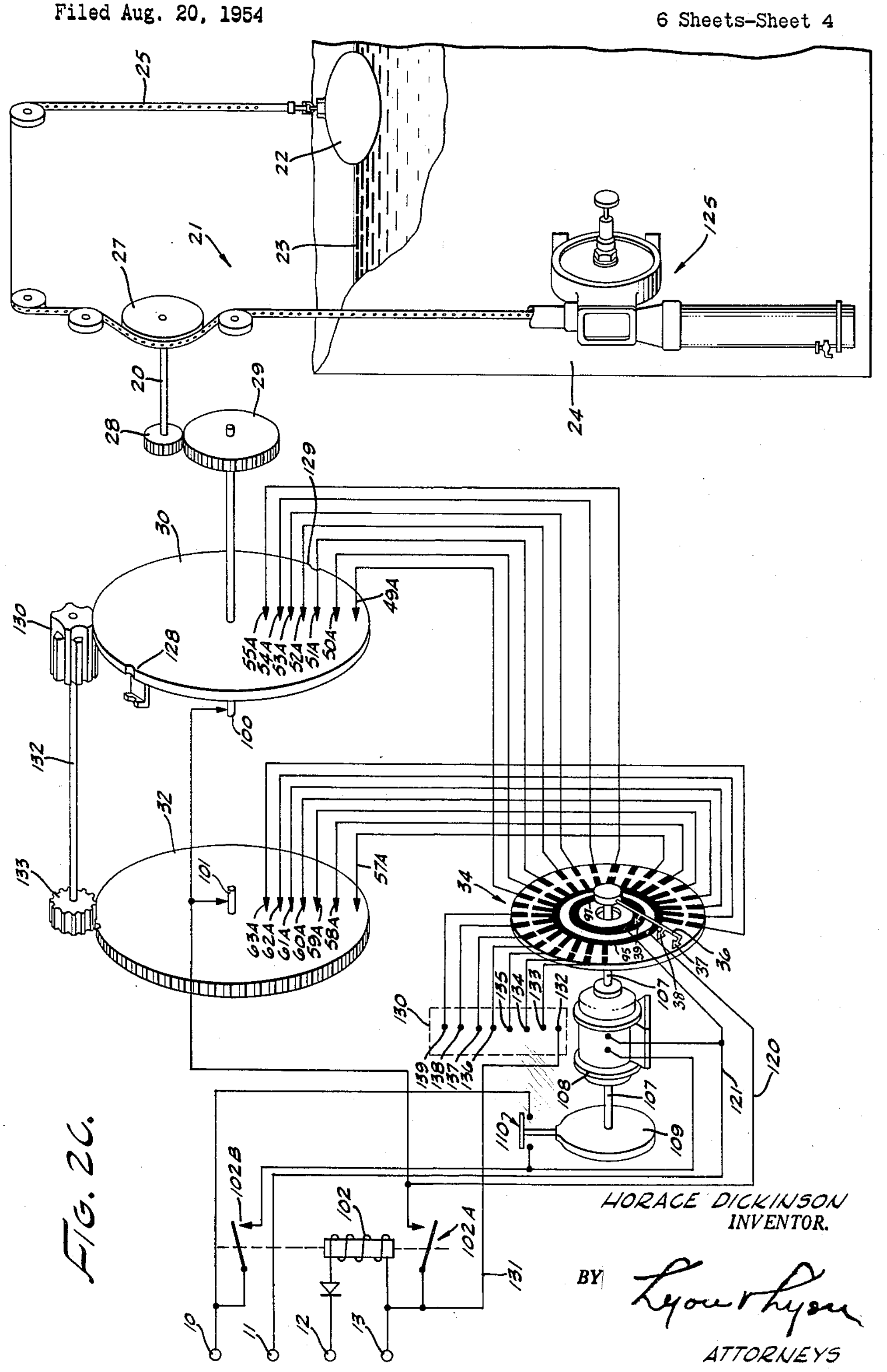
Figure 2C illustrates, partly in schematic and partly in structural form, apparatus at the transmitting station used in both system A and in system B.

Figure 10 illustrates the arrangement of segments on the one revolution disc illustrated in Figure 2C.

DESCRIPTION OF SYSTEM A IN CONNECTION WITH FIGURES 2A, 2B, 2C, AND 2D

Figure 2D:
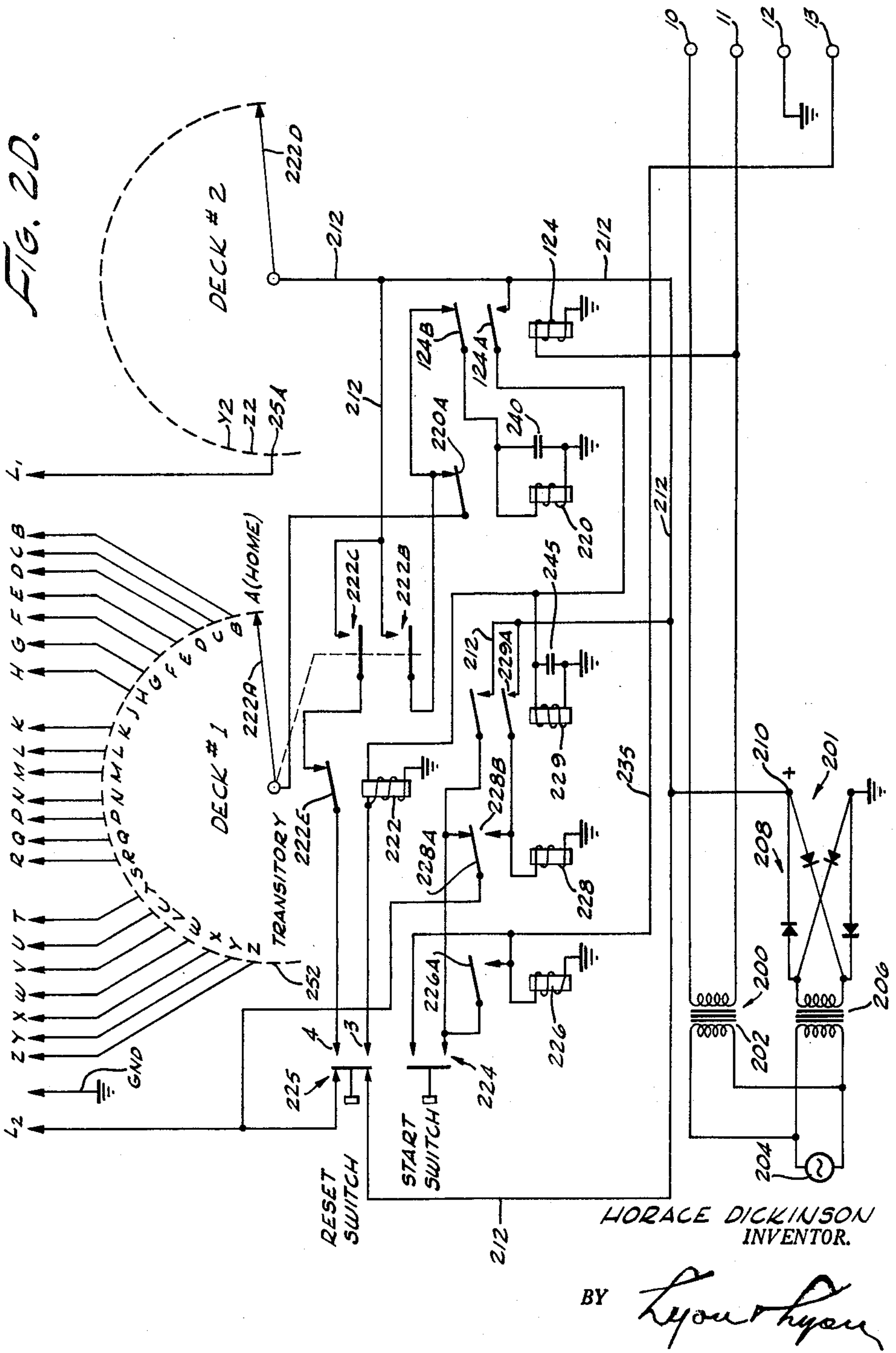
Figure 2D illustrates another portion of the apparatus at the receiving station used in system A only.

The systems described herein are designed specifically for telemetering the liquid level in petroleum storage tanks and such systems inculde transmitting apparatus illustrated in Figure 2C located at the remote or transmitting station or tank end of the system and such system includes also the receiving and control equipment illustrated in Figures 2A, 2B, and 2D located at the receiving or local station. The system provides reliable liquid level readings to the nearest eighth of an inch over unlimited distances, the equipment at the transmitting and receiving stations being interconnected by a four wire control cable with corresponding conductors thereof extending between the correspondingly designated terminals 10, 11, 12, and 13 in Figures 2C and 2D.

DESCRIPTION OF TRANSMITTER UNIT ILLUSTRATED IN FIGURE 2C

The transmitter shown in Figure 2C is located at the storage tank and is essentially a mechanical position transducer. The input to the transmitter is mechanical displacement in the form of rotation of the shaft 20 and is provided by a conventional float operated mechanism 21 that includes the float 22 disposed in liquid 23 in the tank 24.

As the float 22 rises and falls with the level of liquid 23, a perforated steel tape 25 attached to the float transmits this motion to a sprocket sheave 27 and thus, provides a rotation of the shaft 20 in proportion to the liquid level. The input shaft 20 of the transmitter is connected through gearing 28 and 29 to two code discs 30 and 32 which have conducting segments thereon in the pattern as shown by the black portions in Figures 7 and 8, respectively. The disc 30 is for the inch increment of the liquid level, the other disc being for the foot increment. As seen in Figures 7 and 8, each of the code discs has seven code tracks on its surface and for each disc there are seven contact brushes, one for each code track that contact the code disc segments according to the position of the disc or liquid level. The transmitter includes a motor driven sampling commutator switch in the form of a disc 34 that has connecting segments thereon in the pattern illustrated in Figure 10, for sampling the particular positions of the code discs 30 and 32. This disc 34 also includes conducting segments for uniquely establishing the particular tank with which the apparatus is associated in the form of a particular tank number. During the gauging cycle, contact arm 36, having the brushes 37, 38, and 39, is automatically rotated one complete revolution to cause such brushes 37, 38, and 39 to sequentially contact the corresponding radially disposed segments on the disc 34. The contacting segments on the disc 34 are disposed circumferentially so that each conducting segment thereon corresponds to a possible contact position on the code discs 30 and 32, and as the sampling switch arm 36 revolves, a pulse is transmitted for each of these positions. Thus, the contact brush 37 is arranged to sequentially engage the relatively large outer series of segments 40–63 both inclusive, while the brush 38 is arranged to sequentially contact the inner relatively small contacts 70–93 both inclusive, the outer contacting area 40, as shown in Figure 10, overlapping the inner contacting area in a circumferential sense and extending slightly more than twice the circumferential distance of the corresponding inner contacts. Each of the inner contacts 70–93, both inclusive, are connected to a common conducting area or ring 95. The contact brushes 37 and 38 are arranged to contact respectively, such outer and inner series of contacts 40–63 and 70–93, while the other brush 39 continuously contacts the inner circular conducting area or ring 97.

This arrangement is for the purpose of developing a train of pulses that are either in the form of a short pulse (dot), or in the form of a long pulse (dash), depending upon the particular position of the code discs 30 and 32. In addition to the liquid level code, the transmitter is arranged to transmit a code number to indicate at the receiver that particular tank which is being gauged. This is accomplished by using up to seven of the sampling switch positions for the tank number code corresponding to contacts 41, 42, 43, 44, 45, 46, and 47. These contacts are wired to a terminal strip so that the code and thus the tank number can be set to suit a particular installation. At the end of the gauging cycle, during which the contact arm 36 makes one complete revolution, the motion of the contact arm 36 is stopped.

This train of coded pulses appears at the connector 11, in operation of this system, for transmission over the communication link to the apparatus illustrated in Figure 2D for decoding and subsequent indication.

The outer conducting segments 40, 48, and 56 are left unconnected or blank to provide a desired timed spacing. The series of contacts 41–47, as indicated above, are used for purposes of coding the particular tank number. The series of contacts 49–55, respectively, are connected to corresponding brushes 49A, 50A, 51A, 52A, 53A, 54A, and 55A associated with the inch code disc 30. The remaining outer contacts, namely, contacts 57–63, both inclusive, are connected respectively, to brushes 57A–63A associated with the foot code disc 32.

These code discs 30 and 32, as shown in Figures 7 and 8, each include seven radially disposed tracks engageable with a corresponding one of the seven associated brushes, and the central area of each of the discs 30 and 32 comprises a conducting area electrically connected to their corresponding rotatable shafts 100 and 101. Such shafts 100 and 101 are each connected to the inner conducting segments 95 on the commutator disc 34 and also to the stationary contact of the normally open relay switch 102A, having the energizing coil 102.

The contact arm 36 is mounted on the shaft 107 of the alternating current motor 108 which may be energized with an A.C. voltage applied to the terminals 10 and 11. It is noted that one terminal of the motor 108 is connected to the terminal 11 for its energization and such motor terminal is also connected to the inner conducting ring 97 on disc 34 for a different purpose. The other terminal of the motor 108 is connected to the stationary contact of the normally open relay switch 102B, having the winding 102 and also to one terminal of the cam operated switch 110. It is noted that the switches 110 and 102B are connected in parallel and each having one terminal thereof connected to the energizing terminal 10.

In operation of the system, as described in more detail later, current is applied to the relay coil 102 to close the switch 102B to thereby completely energize the motor 108 with the result that the shaft 107 carrying the cam 109 is rotated to thereby allow the switch 110 to close. Once the switch 110 is closed, the relay winding 102 remains energized until the end of the gauging cycle, i.e., until the completion of the 24 pulses. The general purpose of the switch 110 is to prevent the transmitter sampling commutator arms from coming to rest in the middle of a cycle and thus start from the middle of a cycle under conditions of abnormal operation such as momentary power failure. This particular arrangement thus provides automatic rotation of the contact arm 36 through only one complete revolution during which time a train of pulses is developed, comprising a series of intermixed long and short pulses, the particular arrangement of which is dependent upon the position of the code discs 30 and 32. Since only one revolution of the contact arm 36 is permitted, it is clear that only a predetermined number of pulses may be developed during one complete revolution of the arm 36.

The shaft 107 of the motor 108 is rotated at such a speed that pulses having the periodicity of 200 milliseconds is produced as indicated in Figure 9. The short pulses corresponding to dots each have a duration of approximately 67 milliseconds while the longer pulses corresponding to dashes, have a duration twice this amount or approximately 134 milliseconds.

It will be observed that a short pulse corresponding to a dot is produced, in general, when the arm 36 is in a position wherein the brush 38 is in engagement with one of the inner conducting segments 70–93, as the case may be, with, however, the outer brush 37 disconnected electrically from any conducting segment on the code disc 30 or 32, as the case may be. Thus, during one revolution of the arm 39, a train of pulses is produced which are always 24 in number. Some of such pulses may be long pulses depending upon whether the corresponding contact 49A–55A, or contact 57A–63A, as the case may be, is in engagement with a particular conducting segment on the code disc 30 or 32, respectively.

In producing a short pulse corresponding to a dot, a unidirectional current flows from terminal 13, through the relay switch 102A, through the conductor 120, through a portion of the conducting ring 95, through one of the inner short conducting segments 70–93, as the case may be, through the brush 38, through the conducting arm 36, through a portion of the inner conducting ring 97, through the lead 121, and to the terminal 11. This conducting path, thus defined, serves as an energizing circuit for the relay winding 124 (Figure 2D). In like manner, the conducting circuit which is formed for producing a long pulse corresponding to a dash extends as follows: from the terminal 13, through the relay switch 102A, through either shaft 101, or 100, as the case may be, through a conducting segment on either the corresponding code disc 32 or 30, as the case may be, through either one of the series of contacts 57A–63A or through one of the series of contacts 49A–55A, through one of the corresponding outer large conducting segments 41–47, or 49–55, or 57–63, as the case may be, through the outer brush 37, through the conducting arm 36, through a portion of the inner ring 97, and to the output terminal 11.

Preferably, the perforated steel tape 25 passes over a 12 inch sprocket sheave 27 and is associated with a conventional counterbalancing mechanism 125. The input shaft 20 is connected through a 2:1 gearing 28, 29 to the two code discs 30 and 32. The inch code disc 30 is connected to the foot code disc 32 through intermittent gearing consisting of two sets of pickup teeth 128 and 129 spaced 180° apart on disc 30. Such pickup teeth coact with the interrupted or mutilated pinion 130 mounted on the shaft 132 for driving the pinion gear 133 that coacts with the foot disc 32.

The inch code disc 30 revolves 180° for each foot of liquid level and for each 180° of movement of the inch code disc 30, the interrupted or mutilated pinion 130 is advanced two teeth. The ratio between movement of the inch disc 30 and the foot disc 32 is 60:1. Thus, for each 12 inches of liquid level change or 180° movement of the inch code disc 30, the foot disc 32 is moved one sixtieth of a revolution.

Preferably, these discs 30 and 32 consist of thin metallic segments bonded to an insulating material backing. The metallic segments are arranged in a predetermined pattern according to the code, which is explained hereinafter.

The inch disc 30 is arranged to code two feet or 24 inches in one revolution. It is, therefore, divided into 192 parts or codes, each one representing an ⅛ inch increment. The radial line 130 and 131, respectively, in Figures 7 and 8, respectively, indicate the starting point or zero level for each of the corresponding discs 30 and 32. It is noted that the inch code disc 30 is symmetrical and thus may be rotated in either direction to obtain increased values. The foot disc 32 is arranged for clockwise rotation with increasing liquid level. Such foot disc 32 is divided into 60 parts to code foot increments for a 60 foot range.

It is noted that Figure 7 has indicated thereon the ⅛ inch, as well as, the ¼ inch position of the inch disc. The inch disc 30 has thus, 192 possible electrical positions corresponding to 8×12×2. In similar manner the disc has 60 possible electrical positions.

These code discs 30 and 32 are provided with conducting segments in accordance with the information set forth in Tables I and II, wherein the numeral 1 indicates that a metallic segment exists for a given level increment and numeral 0 indicates that there is no metallic segment for the level increment.

As noted previously, the outer conducting areas 41–47 (Figure 10) are used to code the tank number, leads from these conducting areas or positions are connected to the terminal strip 130, and the lead 131 from the B+ terminal 13 is connected also, to a terminal on such strip 130. In service, jumpers or connections are made between the B+ terminal 132 and one or more of the other terminals 133–139, according to the tank number to establish the proper code. The sampling switch positions for the tank number code are assigned "weights" according to binary notation, the last four representing the least significant figure of the tank number. Thus, terminal 139 has a value of one, terminal 138 has a value of two, terminal 137 has a value of four, terminal 135 has a value of eight. For the more significant figure, terminal 136 has a value of one, terminal 134 has a value of two, and terminal 133 has a value of four. To establish the tank number, the proper combination of tank number code positions corresponding to terminals 139 through 133, are connected to the B+ terminal 132 according to the charts shown herein as Tables III and IV.

*Table I*

| Digit | R | Q | P | N | Digit | M | L | K |
|---|---|---|---|---|---|---|---|---|
| 0 | 0 | 0 | 0 | 0 | 0 | 0 | 0 | 0 |
| 1 | 0 | 0 | 0 | 1 | ⅛ | 0 | 0 | 1 |
| 2 | 0 | 0 | 1 | 1 | ¼ | 0 | 1 | 1 |
| 3 | 0 | 0 | 1 | 0 | ⅜ | 0 | 1 | 0 |
| Even 4 | 0 | 1 | 1 | 0 | ½ | 1 | 1 | 0 Even |
| 5 | 0 | 1 | 0 | 0 | ⅝ | 1 | 1 | 1 |
| 6 | 1 | 1 | 0 | 0 | ¾ | 1 | 0 | 1 |
| 7 | 1 | 1 | 1 | 0 | ⅞ | 1 | 0 | 0 |
| 8 | 1 | 0 | 1 | 0 | | | | |
| 9 | 1 | 0 | 1 | 1 | 0 | 1 | 0 | 0 |
| 10 | 1 | 0 | 0 | 1 | ⅛ | 1 | 0 | 1 |
| 11 | 1 | 0 | 0 | 0 | ¼ | 1 | 1 | 1 |
| 0 | 1 | 0 | 0 | 0 | ⅜ | 1 | 1 | 0 Odd |
| 1 | 1 | 0 | 0 | 1 | ½ | 0 | 1 | 0 |
| 2 | 1 | 0 | 1 | 1 | ⅝ | 0 | 1 | 1 |
| Odd 3 | 1 | 0 | 1 | 0 | ¾ | 0 | 0 | 1 |
| 4 | 1 | 1 | 1 | 0 | ⅞ | 0 | 0 | 0 |
| 5 | 1 | 1 | 0 | 0 | | | | |
| 6 | 0 | 1 | 0 | 0 | | | | |
| 7 | 0 | 1 | 1 | 0 | | | | |
| 8 | 0 | 0 | 1 | 0 | | | | |
| 9 | 0 | 0 | 1 | 1 | | | | |
| 10 | 0 | 0 | 0 | 1 | | | | |
| 11 | 0 | 0 | 0 | 0 | | | | |

*Table II*

| Digit | Z | Y | X | Digit | W | V | U | T |
|---|---|---|---|---|---|---|---|---|
| 0 | 0 | 0 | 0 | 0 | 0 | 0 | 0 | 0 |
| 1 | 0 | 0 | 1 | 1 | 0 | 0 | 0 | 1 |
| 2 | 0 | 1 | 1 | 2 | 0 | 0 | 1 | 1 |
| 3 | 1 | 1 | 1 | 3 | 0 | 0 | 1 | 0 |
| 4 | 1 | 0 | 1 | 4 | 0 | 1 | 1 | 0 |
| 5 | 1 | 0 | 0 | 5 | 1 | 1 | 1 | 0 Even |
| | | | | 6 | 1 | 0 | 1 | 0 |
| | | | | 7 | 1 | 0 | 1 | 1 |
| | | | | 8 | 1 | 0 | 0 | 1 |
| | | | | 9 | 1 | 0 | 0 | 0 |
| | | | | 0 | 1 | 0 | 0 | 0 |
| | | | | 1 | 1 | 0 | 0 | 1 |
| | | | | 2 | 1 | 0 | 1 | 1 |
| | | | | 3 | 1 | 0 | 1 | 0 Odd |
| | | | | 4 | 1 | 1 | 1 | 0 |
| | | | | 5 | 0 | 1 | 1 | 0 |
| | | | | 6 | 0 | 0 | 1 | 0 |
| | | | | 7 | 0 | 0 | 1 | 1 |
| | | | | 8 | 0 | 0 | 0 | 1 |
| | | | | 9 | 0 | 0 | 0 | 0 |

*Table III*

| Tank No., 2nd Digit | Connect to + Terminal |
|---|---|
| 0 | None |
| 1 | 139 |
| 2 | 138 |
| 3 | 139-138 |
| 4 | 137 |
| 5 | 137-139 |
| 6 | 138-137 |
| 7 | 139-138-137 |
| 8 | 136 |
| 9 | 136-139 |

*Table IV*

| Tank No., 1st Digit | Connect to + Terminal |
|---|---|
| 0 | None |
| 1 | 135 |
| 2 | 134 |
| 3 | 134-135 |
| 4 | 133 |
| 5 | 133-135 |
| 6 | 134-135 |
| 7 | 133-134-135 |

Thus, it is clear that one revolution of the motor shaft 107 causes the development of a train of coded pulses which are intermixed short and long pulses depending upon the particular position of the code discs 30 and 32. The arm 36 on the shaft 107 rotates in a clockwise direction in Figure 2C and the beginning of either a short pulse or a long pulse, as the case may be, is initiated at the same time since, as clearly shown in Figure 10, the leading edges of the outer long and corresponding inner short conducting segments lie on a radial line that extends through the center of the disc and, of course, through the center of rotation of the arm 36.

In one revolution of the arm 36, 24 pulses are developed regardless of the position of the code discs 30 and 32 or regardless of which of the terminals on the terminal strip 130 may be interconnected, this being so since there are 24 short interconducting segments 70–93. These inner short conducting segments, of course, serve to develop short pulses in the form of dots, but such dots are subject to being substituted for dashes in accordance with whether or not the corresponding adjacent radially disposed large conducting segment may happen to be connected to B+, i.e., terminal 13.

Thus, by these means, information as to the particular tank number and reading of the liquid level in terms of feet, inches, and eighths of an inch is encoded and appears in the particular form of the train of pulses which is developed.

RECEIVING APPARATUS OF SYSTEMS A DESCRIBED IN CONNECTION WITH FIGURES 2A, 2B, AND 2D

It is understood that the terminals 10, 11, 12, and 13 in Figure 2D are connected to the identically numbered 10, 11, 12, and 13 in Figure 2C over a four wire communication link; and that the terminals designated by letters in the uppermost part of Figure 2D are connected to identically lettered terminals in both Figures 2A and 2B so as to complete System A.

Figure 2D includes the control apparatus and power supply required for energization of the one revolution motor 108 and the control relay 102 in the transmitter (Figure 2C), so as to develop the train of coded pulses that appear on terminal 11, in the manner described in the preceding heading. For this purpose, the receiver includes two power supplies 200 and 201. Supply 200 is a single alternating current source which includes the transformer 202 which has its primary connected to the alternating current source 204. This source is used only for supplying energy to the one revolution motor 108. The source 201 is an isolated direct current source which includes the transformer 206 having its primary connected to the A.C. source 204 and includes, also, a rectifier 208 for developing a positive rectified voltage on the terminal 210. The other terminal of the source 201 is grounded, as shown in Figure 2D. Thus, normally, an alternating current voltage appears between the terminals 10 and 11 and a unidirectional voltage, that is positive with respect to ground, appears on the leads 212 which are all connected to the terminal 210.

It is noted that the terminal 12 is grounded and that there appears during the gauging operation, a series of the aforementioned train of pulses on terminal 11 besides the aforementioned alternating current voltage, but the various relays shown herein are of the direct current type and are not operated by the alternating current voltage that may appear on terminal 11.

The control apparatus shown in Figure 2D includes also a repeater relay having the winding 124; a timing relay having the winding 220; a 25 position plus "home" spring driven stepping switch driven by the solenoid having the winding 222; a start push button switch 224; a re-set push button switch 225; a sealing relay having the winding 226; and a circuit in the nature of a pulse counting circuit which includes the relays having the windings 228 and 229, respectively.

For convenience and as of reference, the various relays each have their energizing winding designated by a characteristic reference numeral and the particular switches which may be actuated upon energization of such winding has the same reference numeral but a characteristic letter appended thereto. For example, the relay having the winding 124, has also switches 124A and 124B which are actuated when the winding 124 is energized. This particular designation is used throughout the specification and drawings.

The apparatus illustrated in Figures 2D and 2C is shown in the position corresponding to the condition existing immediately prior to energization of a gauging cycle. In this condition the stepping switch having the winding 222 has its switch arm 220A, at rest, on the "home" position designated as such in Figure 2D. Such stepping switch is of conventional manufacture and has associated therewith so-called "off normal" switches 222B and 222C that are open only in the "home" position of the arm 222A, but are closed in all other positions of the arm 222A. This particular stepping switch which includes the winding 222 is of the type in which the arm 222A is advanced only after the winding 222 is energized and then allowed to become de-energized, i.e., the arm 222A is advanced only after the end of a pulse applied to the winding 222.

In order to initiate the gauging cycle, the start switch, which is a normally open momentary type of push button switch, is closed to lock in relay 226 through its normally open switch 226A, at the same time applying power to terminal 13 to thereby energize the relay 102 (Figure 2C) through the following circuitry. Closure of the start switch 224 serves to energize relay winding 226 through a circuit which extends from the high voltage lead 212 through the normally closed contacts of the re-set switch 225 through the normally closed relay switch 228A, through the switch 224 and through the coil 226. When the coil 226 is thus energized, closure of its switch 226A, which is connected in parallel with the start switch 224 serves to seal the winding 226 in energized condition and to also maintain the unidirectional voltage on lead 235 which extends between winding 226 and the terminal 13 to thereby energize relay winding 102 (Figure 2C); energization of the winding 102 results in closure of the relay switches 102A and 102B so as to apply alternating current to the motor 108 and to apply the unidirectional voltage to shafts 100 and 101 to thereby automatically cause the arm 36 to rotate one complete revolution and then stop to develop the train of coded pulses, all as described under the preceding heading. This train of coded pulses appears on the terminal 11, which is connected to the ungrounded terminal of the repeater relay winding 124. This relay winding 124 is energized 24 times each gauging cycle in accordance with either a long pulse or a short pulse, as the case may be. When the winding 124 is energized, the normally open switch 124A is closed and the normally closed switch 124B is opened. Closure of the switch 124A results in application of B+ voltage from lead 212 to the ungrounded terminal of the stepping switch winding 222 so that such winding 222 is likewise energized 24 times during a gauging cycle. The first pulse in such train 124 thus causes the winding 222 to be energized and immediately after the cessation of such pulse, the winding 222 is de-energized so as to allow spring means associated with the stepping switch to move the arm 222A from its "home" position to engagement with the stepping switch contact B. This initial movement of the arm 222A is contemporaneous with closure of the so-called "off-normal" switches 222B and 222C. Once these switches 222B and 222C have been thus closed, they remain closed until the stepping switch is returned to its "home" position as described later. When switch 222B is thus closed the B+ voltage appearing on lead 212 is applied through such switch and also switch 124B to the ungrounded terminal of the timing relay coil 220. It is noted that the winding 220 is shunted by condenser 240 to form a so-called "time out" relay circuit. Each incoming pulse, after the first, serves to energize the winding 222 and to de-energize winding 220. The relay having the winding 220, however, is slow to drop out because of the stored charge in the condenser 240, and is so timed as to allow its normally open switch 220A to close when the incoming pulse is a dash, i.e., a long pulse. A dot, or short pulse, however, does not provide sufficient time for the relay, having the winding 220, to close its switch 220A before such coil 220 is again energized by the closure of switch 124B at the end of a pulse. In other words, switch 220A is allowed to close only in response to a long pulse appearing on lead 11 and to remain open in response to a short pulse. When the relay switch 220A is closed, B+ voltage appearing on lead 212 is applied through switches 222B and 220A to the switch arm 222A to thereby energize the particular lettered relay winding corresponding to the identically numbered contact that is engaged at that particular time by the arm 222A.

It will be appreciated that the stepping switch arm 222A is intermittently moved in timed relationship with movement of the arm 36 in Figure 2C, and that for purposes of reference and convenience, the following Table V serves to correlate the various conducting segments on the commutator switch 34, the corresponding terminals on the terminal step 130, the corresponding brushes on the code discs 30 and 32, and the position of the selector switch arm 220A.

It is noted that the stepping switch in Figure 2D has two decks of switch contacts. The terminals for deck No. 1 of the stepping switch include a "home" contact, a series of contacts lettered A–Z (omitting the letters I and O), followed in succession by a contact 25 and a transitory contact indicated as such in Figure 2D. The upper deck has a like number of contacts, but only one contact, namely, contact 25A, which is in a position corresponding to contact 25 in deck 1, is electrically connected. Such contact 25A is connected to the terminal L1. The contact arm 222D follows the movement of the contact arm 222A so that these arms contact simultaneously the corresponding contacts 25 and 25A. At the end of the gauging cycle, both arms 222A and 222D engage, respectively, the contacts 25 and 25A. For each of the sequence positions B through Z a connection is made between the B+ lead 212 and the stepping switch wiper arm 222A for a long pulse only. Thus, for each dash received, the corresponding code translator relay winding B through Z (Figures 2B and 2A) is energized and locked in by its corresponding holding switch B1 through Z1, respectively. Thus, for example, once one of such code translator relay windings is energized, for example, relay winding K, such relay is maintained in an energized condition by a current which flows through the following path, namely: from the lead 212, through the normally closed portion of the reset switch 225, through terminals L2, through the lead 245, through the switch K1, through the relay winding K, and then to ground.

*Table V*

| Pulse No. | Short Segment on Disc 34 | Long Segment on Disc 34 | Terminal on Strip 30 | Brush on Inch Code Disc 30 | Brush on Foot Code Disc 32 | Position of Step Switch Arm 222A After Pulse |
|---|---|---|---|---|---|---|
| 1 | ----- | ----- | ----- | ----- | ----- | Home |
| 1 | 70 | 40 | ----- | ----- | ----- | B |
| 2 | 71 | 41 | 133 | ----- | ----- | C |
| 3 | 72 | 42 | 134 | ----- | ----- | D |
| 4 | 73 | 43 | 135 | ----- | ----- | E |
| 5 | 74 | 44 | 136 | ----- | ----- | F |
| 6 | 75 | 45 | 137 | ----- | ----- | G |
| 7 | 76 | 46 | 138 | ----- | ----- | H |
| 8 | 77 | 47 | 139 | ----- | ----- | J |
| 9 | 78 | 48 | ----- | ----- | ----- | K |
| 10 | 79 | 49 | ----- | 49A | ----- | L |
| 11 | 80 | 50 | ----- | 50A | ----- | M |
| 12 | 81 | 51 | ----- | 51A | ----- | N |
| 13 | 82 | 52 | ----- | 52A | ----- | P |
| 14 | 83 | 53 | ----- | 53A | ----- | Q |
| 15 | 84 | 54 | ----- | 54A | ----- | R |
| 16 | 85 | 55 | ----- | 55A | ----- | S |
| 17 | 86 | 56 | ----- | ----- | ----- | T |
| 18 | 87 | 57 | ----- | ----- | 57A | U |
| 19 | 88 | 58 | ----- | ----- | 58A | V |
| 20 | 89 | 59 | ----- | ----- | 59A | W |
| 21 | 90 | 60 | ----- | ----- | 60A | X |
| 22 | 91 | 61 | ----- | ----- | 61A | Y |
| 23 | 92 | 62 | ----- | ----- | 62A | Z |
| 24 | 93 | 63 | ----- | ----- | 63A | 25 |

At the completion of the gauging cycle, or at position 25, power is supplied to lead L1 of the translator networks through the stepping switch deck No. 2 arm 222C for purposes of illuminating those particular indicating lamps to which a conducting connection is made. At the completion of the gauging cycle, the particular lettered translator relays which are locked in, correspond to the transmitter code disc positions, as well as, to the particular connections at the terminal strip 130 (2C); and thus, these particular relays with their associated relay switches are used for purposes of establishing the aforementioned conducting connections for proper indication of liquid level and tank number. The relay switches of the translator relays B through Z are connected in a decoding network, the output of which is connected to a visible readout panel, indicated as such in Figure 6.

Referring to Figure 2B, for the tank number translator there are 18 lamps, 0 through 9 representing the digits 0 through 9, and the lamps 0 through 7 representing the units times tens, figures 0 through 7. Thus, the tank number is indicated by two lamps illuminating a visual readout panel shown in Figure 6. The liquid level translator illustrated in Figure 2A is similar except that there are four groups of indicator lamps, 0 through ⅞ for inch fractions, 0 through 11 for inches, 0 through 9 for feet, and 0 through 5 for feet times ten. Thus, at the end of the gauging cycle, there will be four lamps illuminated indicating feet times ten, feet, inches, and eighths of an inch.

Referring again to Figure 2D during the gauging cycle, at the first pulse received, the relay winding 229 is energized through the switch 124A and the relay winding 228 is energized through the relay switch 229A. The relay having the winding 229 is a slow drop-out relay by reason of condenser 245, which is connected in shunt with the winding 229; and thus, such relay remains energized between pulses, either long pulses or short pulses. The B+ which appears on lead 212 is applied to terminal 13 through the relay switch 226A, through the normally closed relay switch 228A, or through the normally open switch 228B, as the case may be, and the relay switch 229A. When, however, the winding 228 is energized, as mentioned above, there is a B+ path to terminal 13 only when the relay winding 229 is energized. At the completion of the 24 pulses, which constitute the train of coded pulses, the relay having the winding 229, drops out breaking the B+ path to the relay winding 226 and to terminal 13 to thereby allow also the relay winding 102 (2C) to become de-energized. At this particular instance the relay windings 226, 124, 229, are de-energized. When the relay winding 102 in Figure 2C is de-energized, the motor current path through switch 102B is interrupted, but at this time, the limit switch 110 is closed providing a motor current path. The motor 108 continues to run until the cam 109 opens the switch 110, in which case, the motor stops and the transmitter is in position for the next gauging cycle.

Thus, at the completion of the gauging cycle, the appropriate lamps in the indicator panel in Figure 6 will be illuminated to indicate the tank number and the liquid level, and this condition remains until the operator operates the reset switch 225.

It is of importance to note that a reading will be indicated only when the apparatus at the receiving station responds only to 24 pulses, i.e., only when the contact arm 222D rests on the contact Z2 in Figure 2D.

The receiving apparatus may be reset, as indicated above, by operating the reset switch 225; in which case, the holding current circuit for the translator relays that are lettered in Figures 2A and 2B is interrupted and such translator relays drop out. In such case, also, B+ is applied through contacts 3 and 4 of switch 225 to the stepper switch coil 222 through a circuit which includes the B+ lead 212, the switch 222C, the switch 222E, the bridged contacts 3 and 4, and the winding 222. The stepping switch will then operate self interrupted and step to the "home" position at which the switches 222B and 222C are both open. In such "home" position all relays are open and the receiver is ready for the next gauging cycle.

The system described thus far is suitable for use only where one tank is to be gauged. By inserting a selector switch, as shown in the block diagram in Figure 1, between the receiver output terminals and the transmitter units, any number of transmitters may be used with one receiver.

For installations requiring telemetering over long distances, it is desirable to reduce the number of conductors required between the receiver and the transmitter. For this type of service, a telephone-type dialing system is used for tank selection as described now in connection with System B which includes Figures 2A, 2B, 2C, and 2E, all interconnected as indicated in the various figures.

DESCRIPTION OF SYSTEM B

System B includes Figures 2A, 2B, 2C, and 2E, all interconnected, and since Figures 2A, 2B, and 2C have been described above in connection with System A, the following description under this heading, is devoted largely to a description of Figure 2E since the operation and functioning of the apparatus illustrated in Figures 2A, 2B, and 2C is not altered by its connection with the apparatus illustrated in Figure 2E. For purposes of simplicity, wherever practical, corresponding elements in Figures 2E and 2D have identical reference numerals.

It is noted that Figure 2E includes a communication link in the form of a pair of wires 300 and 301, the wire 301 being grounded. This two wire link serves to connect apparatus at a local station and as shown on the left of Figure 2E to a remotely located installation, at which there is apparatus as shown on the right in Figure 2E.

The apparatus at the local station includes a selector dial 304 of the telephone type as shown in Figure 5 for manual operation by an operator who may select a particular one of a plurality of remotely located tanks for gauging the liquid level of the particular selected tank.

Briefly, operation of the selector dial 304 results in the transmission of selecting pulses over the communication link 300, 301 to each of the remotely located stations, at each of which, as shown in Figure 2E, a relay control circuit is provided to step the arms 305A and 305B of the selector switches 307 and 308, respectively, around to a position which corresponds to the particular number that is dialed by the dial 304. The stationary contact of the selector switches 307 and 308 are coded in a unique manner so that only one pair of leads 12, 13 at a particular transmitter is placed in conductive relationship with the corresponding arms 305B and 305A, in which case, the apparatus illustrated in Figure 2C at that particular transmitter is energized to produce movement of the motor shaft 107 through one complete revolution only, in the manner described above, to thereby produce a train of coded pulses, the exact nature of which is dependent upon the particular position of the discs 30 and 32. Such train of coded pulses is transmitted over the communication link 300, 301 to actuate the arm 310 of the stepping switch 312 to a corresponding position. The contacts of such stepping switch 312 is connected as indicated to the read-out circuitry described above in connection with Figure 2A to produce a visible indication of the liquid level at the particular tank which is selected by use of the dial 304.

More specifically, the selector dial 304 includes a rotatable switch actuating cam 320 of conventional nature which serves to actuate the switch 321 a predetermined number of times depending upon the particular number that is dialed. The selector also includes a switch 323 which is normally closed and a normally open switch 322 in the so-called "home" position of the dial. The switches 322 and 323 have a common movable contact 325. Switches 322, 323 are the so-called dial "shunt springs"; these are not operated by cam 320, but are operated by the dial plate in such a manner that as soon as the dial is removed from its "at rest" position, as during dialing, switch 323 opens and switch 322 closes.

It is noted that the switches 321 and 322 are serially connected between the cable conductor 300, and the positive ungrounded lead 327 of the direct current source 328 so that this circuit may be periodically interrupted in a predetermined fashion to transmit selecting pulses over the transmission line conductor 300 and to that apparatus connected to conductor 300.

Normally such conductor 300 is connected through the normally closed switch 307A, a so-called "on-normal" switch of the 10 position direct driven stepping switch 307. The first pulse in the series of selecting pulses is thus transmitted over conductor 300, through the normally closed switch 307A, and through the winding 330 of a control relay, and then over the grounded transmission line conductor 301. This first pulse thus causes the relay switch 330B to close to thereby close an energizing circuit for the timing relay having the winding 340. This energizing circuit extends from the positive lead 342 of the direct current source 343, through the relay switch 330B, through the relay winding 340, and to the grounded negative lead 345 of source 343. The relay winding 340 has a relatively large condenser 348 connected in parallel with the same so that a predetermined time delay, on drop-out results, i.e., the relay having winding 340 may be maintained in an actuated position for a predetermined time interval even though the switch 330B is subsequently open.

This energization of relay winding 340 results in actuation of the associated relay switches 340A, 340B, and 340C. The resulting closure of switch 340A, which is in parallel with the aforementioned switch 307A, provides a new conducting path to conductor 300 through which the relay winding 330 is energized by the second and succeeding selecting pulses. Closure of the relay switch 340C closes an energizing circuit for the winding 305 of the stepping switch 307. This stepping switch also includes a winding 307R for releasing the stepping switch in a manner described later. Thus, the winding 305 is energized through a circuit extending from the positive lead 342, through the switch 330A (which leads to its normally closed position after cessation of a pulse), the switch 340C, the winding 305, and the grounded negative lead 345. This energization of winding 305 results in stepping of the contact arms 305A and 305B to engagement with the corresponding designated contact 1. The second selecting pulse transmitted over line 300 again energizes the repeater relay winding 330 through a new energizing circuit which includes the relay switch 340A, the winding 330 and the grounded conductor 301 to thereby recharge the holding condenser 348 so that the winding 340 may be continuously energized during the entire train of selecting pulses. Upon cessation of the second pulse the switch 330A returns to its normally closed position as shown in Figure 2E and the stepping winding 305 is energized for a second time through a circuit which extends from the positive lead 342 through switch 330A, through switch 330C, the winding 305, and the negative lead 345 to thereby move the arms 305A and 305B into engagement with the corresponding stationary contacts designated as 2. This operation continues for each succeeding pulse with the arms 305A and 305B being stepped around to a position corresponding to the number of selecting pulses.

The various contacts of the selecting switch 307 are interconnected uniquely in a coded form so that conductive connections are made at only one of the plurality of remote transmitters between, one the one hand, arm 305A and lead 13, and on the other hand, between arm 305B and lead 12, the leads 12 and 13 being connected to the correspondingly designated terminals in Figure 2C.

A small predetermined time interval after the cessation of the selecting pulses, that are generated using the selector dial 304, the condenser 348 discharges at a controlled predetermined rate, in well known fashion, to allow the relay winding 340 to become de-energized in sufficient amount to allow the associated relay switches to assume their positions shown in Figure 2E in which case the relay winding 330 is no longer sensitive to any pulses which may appear on the conductor 300 (the switches 340A and 307A being open at this time). It is noted that the stepping switches 307A, 307B, and 307C are illustrated in Figure 2 as being in their normal position but once the arms 305A and 305B are stepped from the normal position to the contact 1 or succeeding contacts, these switches are actuated and remain actuated until the arms 305A and 305B are allowed to return to their home position.

Thus, upon cessation of the selecting pulses, the relay 340 is allowed to become de-energized to allow switch 340B to be closed to provide a conducting path from the B+ lead 342 to the arm 305A through circuitry which includes: the lead 342, switch 330A, switch 340B, relay switch 228A and arm 305A. Similarly, the B− lead 345 is then connected to the other switch arm 305B through a path which includes: the lead 345, switch 307C, and the arm 305B to thereby, after selection, to place a positive voltage between the leads 12 and 13 at only one remote transmitter, i.e., the selecting transmitter. Also, upon cessation of such pulses, the selector dial 304, of course, is stationary and in such case, the selector dial switch 323 is allowed to assume its normally closed position shown in Figure 2E to thereby connect the line 300 to the ungrounded terminal of the keying or repeating relay winding 424 having the general function ascribed to the corresponding relay winding 124 in Figure 2D. Thus, the winding 424 is in condition for reception of pulses that are developed at the selected remote station and applied to conductor 300.

This application of voltage to the leads 12 and 13 at the selected transmitter causes, as described above, the development of a train of coded pulses representative of the angular position of the coded discs 30 and 32. This train of coded pulses, as previously described, appears on lead 10 and is applied to the relay winding 324 (which has the general function of the relay winding 124 in Figure 2D) to periodically energize the same either with short pulses or long pulses as the case may be. As described previously, the total number of such coded pulses is 24 and the relay winding 324 is recurrently energized and deenergized 24 times. Energization of the winding 324 results in closure of the normally open relay switches 324A and 324B. The winding 324, of course, is energized for a relatively long period of time when there is a long pulse applied thereto and is energized for a relatively short period of time when a small pulse, in the form of a dot, is applied thereto. Closure of the relay switch 324A serves to connect the positive lead 342 to the conductor 300 through a path which includes: the lead 342, the switch 330A, the switch 340B, the switch 324A, the switch 307B, and the conductor 300. This application of voltage is short in the case of a dot and is relatively long in the case of a dash. Closure of switch 324B results in energizing the time delay relay 229 through a circuit which includes: the positive lead 342, switch 330A, switch 340B, switch 324B, relay winding 229, switch 307C and the negative lead 345 so as to energize such winding 229 and also charge the time delay condenser 245 which is connected in shunt thereto. The condenser 245 causes the winding 229 to remain energized even though the switch 324B is recurrently operated, but a predetermined time interval after the cessation of the train of coded pulses, the condenser 245 discharges sufficient amount and the relay having the winding 229 is allowed to drop out. Thus, the winding 229 may be considered to be energized during the time the train of coded pulses is being transmitted over the conductor 300. Energization of relay winding 229 causes opening of the normally closed switch 229A, closing of the normally open switch 229B and closure of the normally open switch 229C. When switch 299A is opened nothing of importance happens at this particular time, but closure of switch 229B results in a new circuit through which the switch arm 305A is energized. In other words, the switch 229B is not parallel with the normally closed relay switch 228A and serves to provide continuity when the winding 228 is subsequently energized as described later. In other words, the switch 229B is essentially a transfer switch. Closure of switch 229C results in energization of the relay winding 228 through a circuit which includes: the positive lead 342, switches 330A, 340B, switch 229C, winding 228, switch 307C and the negative lead 345. Energization of winding 228 results in opening of the normally closed switch 228, closing of the normally open switch 228B and closure of the normally open switch 228C. Opening of the switch 228A at this particular time is of no consequence since this switch is shunted by the switch 229B, which at this particular moment under consideration, is closed. Closure of switch 228B, which is essentially a sealing switch, serves to provide a more direct path for energizing the winding 228, the switch 228B being in parallel with the switch 229C whereby the winding 228 may remain energized even though subsequently, as described later, the switch 229C, is allowed to open.

A predetermined time after the transmission of the coded pulses, as determined by the discharge rate of condenser 245, winding 229 is allowed to become sufficiently energized to allow the associated relay switches to assume the position illustrated in Figure 2E, in which case, closing of the switch 229A results in application of a voltage to the release solenoid winding 307R of the stepping switch 307 through a path which includes: the lead 342, the switch 330A, switch 340B, switch 229A, switch 228C, winding 307R, switch 307C and the negative lead 345. This energization of winding 307R releases the stepping switch 307 to allow the arms 305A and 305B to return to their normal positions illustrated in Figure 2E, and to also allow the switches 307A, 307B and 307C to assume their normal or "home" positions illustrated in Figure 2E. Opening of the switch 307C, under this condition, interrupts the aforementioned energizing circuit for relay winding 228 and thus the apparatus at the remote station is automatically restored to its normal condition for reception of incoming selecting pulses.

The train of coded pulses, which are transmitted over contacts 300 as described immediately above, are applied in succession to the repeater relay winding 424 through the normally closed switch 323 to effect operation of the associated normally closed switch 424A and normally open switch 424B.

Generally, the various relays controlled by the relay winding 424, which include the relay windings 460, 462, and stepping switch 312, find their counterpart, both as to structure and function, in the previously described arrangement of Figure 2D. The control circuitry in Figure 2E, however, is simplified to the extent that a "start" switch, as illustrated at 224 in Figure 2D is not required since the equivalent start function is accomplished automatically upon operation of the dial selector 304 in Figure 2E. In general, the winding 424 is equivalent to the winding 124 in Figure 2D, the winding 460 is equivalent to winding 220, the winding 462 is equivalent to the winding 222 and the reset switch 463 is equivalent to the reset switch 225. The stepping switch 312 is identical, both in structure and function, with the stepping switch in Figure 2D having the winding 222. Further, the lettered terminals at the upper left hand portion of Figure 2E are connected in identical manner to the correspondingly lettered terminals of the read-out circuitry illustrated in Figure 2A which is connected in identical manner to the circuitry illustrated in Figures 2D and 2E in system A and system B, respectively.

In Figure 2E, the first pulse applied to the relay winding 424 causes the switch 424A to open and the switch 424B to close. Closure of switch 424B results in energization of the stepping switch actuating winding 462 through a circuit which includes: the positive ungrounded lead 327, the switch 424B, the winding 462 and ground. After cessation of this first pulse, switch 424B opens to allow the winding 462 to become de-energized, at which time the associated contact arms 462A and 462B are advanced from their "home" position to their engagement with contact B; and simultaneously the normally closed switch 462C is opened, and the so-called "off-normal" 462E and 462F are closed. These switches 462E and

462F remain closed and are open only when the arms 462A and 462B are in their home position.

Thus, immediately after the cessation of the first pulse, the relay switch 424A is allowed to close to thereby provide an energizing circuit for the relay winding 460 through a path which includes: the positive lead 327, the switch 462F, the switch 424A, the winding 460, and ground, it being noted that the condenser 470, in shunt with the winding 460, is simultaneously charged to impart a desired drop-out characteristic such that the relay having the winding 460 may function as a pulse discriminator. In other words, the condenser 170 has such a magnitude that during the occurrence of a relatively long pulse corresponding to a dash, the relay drops out, but during the occurrence of a short pulse corresponding to a dot, the switch 424A is not opened for a sufficiently long period of time to allow the condenser 470 to discharge to a point where it is no longer effective to maintain the relay in its held in position.

Thus, while the winding 462 is energized and allowed to become de-energized for each of the 24 coded pulses, either long or short pulses, the relay winding 460 is allowed to drop out only during the occurrence of a long pulse, i.e., a dash. Under this particular condition, the associated relay switch 460A is allowed to close and the contact arm 462A, at that particular time is energized through a circuit which includes the positive lead 327, the switch 462F, the switch 460A and the arm 462A, which at that particular time is engaged with one of the lettered contacts to energize a correspondingly lettered relay winding in Figure 2A, such relay winding being sealed automatically in energized condition, as explained previously through a holding circuit that includes the normally bridged contact of the reset switch 463. Thus, as this arm 462A is progressively advanced, it may or may not be energized depending upon whether or not there is a dash or a dot. When the arms 462A and 462B are thus advanced to a position wherein they engage corresponding stationary contact 25, the arm 462B serves to energize the lead $L_1$ to thereby cause those lamps to be energized in Figure 2A which correspond to the liquid level represented by the train of coded pulses. A visible reading is then available and such reading may be effectively erased upon operation of the reset switch 463 which serves to restore the apparatus at the local station to its normal condition illustrated in Figure 2E. Operation of this reset switch 463 serves to bridge the contacts 478 and 479 whereby the stepping switch coil 462 is intermittently energized and de-energized by operation of its associated switch 462C until the arm 462A is returned to its "home" position in which case the switch 462 opens to prevent further energization of winding 462 in this particular manner.

Referring again to Figure 2E, the stationary contacts of the selector switches 307 and 308 may be coded according to Table VI and as designated in Figure 2E. Thus, the terminals to tank No. 1 which correspond to leads 12 and 13 would be connected.

*Table VI*

| Tank or Trans. | B+Ter. 13 | B−Ter. 12 |
|---|---|---|
| #1 | 1 | 7 |
| #2 | 2 | 7 |
| #3 | 3 | 7 |
| #4 | 4 | 7 |
| #5 | 5 | 7 |
| #3 | 1 | 8 |
| #7 | 2 | 8 |
| #8 | 3 | 8 |
| #9 | 4 | 8 |
| #10 | 5 | 8 |

respectively, to the terminals designated as 7 and 1 at the extreme right hand portion of Figure 2E. Similarly the leads 12 and 13 from tank No. 2 are connected respectively, to terminals 7 and 2, etc.

A GENERAL DISCUSSION OF CODING AND A GENERAL DESCRIPTION OF ENCODING AND DECODING USED IN SYSTEMS A AND B

Table VII illustrates the binary coding system which is used in systems A and B, the encoding being accomplished by the inch and feet discs in Figures 7 and 8, respectively, while the decoding is accomplished using the relay system illustrated in Figure 2A.

The code type system used herein is based on a modified binary code, the object of which is to "compress" the information to be transmitted or to reduce the number of "bits" of information.

Referring to Table VII, it is noted that the first three columns are for inch fractions, the second four columns are for inches, the next four columns are for feet and the last three columns are for feet times 10, making a total of 14 columns.

*Table VII*

PULSE CODE BREAKDOWN

| | | Fractions | | | Inches | | | | Foot Units | | | | Feet Tens | | |
|---|---|---|---|---|---|---|---|---|---|---|---|---|---|---|---|
| | | K | L | M | N | P | Q | R | T | U | V | W | X | Y | Z |
| | | 1 | 2 | 3 | 4 | 5 | 6 | 7 | 8 | 9 | 10 | 11 | 12 | 13 | 14 |
| Even | 0 | 0 | 0 | 0 | 0 | 0 | 0 | 0 | 0 | 0 | 0 | 0 | 0 | 0 | 0 |
| | 1 or ⅛ | 1 | 0 | 0 | 1 | 0 | 0 | 0 | 1 | 0 | 0 | 0 | 1 | 0 | 0 |
| | 2 or ¼ | 1 | 1 | 0 | 1 | 1 | 0 | 0 | 1 | 1 | 0 | 0 | 1 | 1 | 0 |
| | 3 or ⅜ | 0 | 1 | 0 | 0 | 1 | 0 | 0 | 0 | 1 | 0 | 0 | 1 | 1 | 1 |
| | 4 or ½ | 0 | 1 | 1 | 0 | 1 | 1 | 0 | 0 | 1 | 1 | 0 | 1 | 0 | 1 |
| | 5 or ⅝ | 1 | 1 | 1 | 0 | 0 | 1 | 0 | 0 | 1 | 1 | 1 | 0 | 0 | 1 |
| | 6 or ¾ | 1 | 0 | 1 | 0 | 0 | 1 | 1 | 0 | 1 | 0 | 1 | ---- | ---- | ---- |
| | 7 or ⅞ | 0 | 0 | 1 | 0 | 1 | 1 | 1 | 1 | 1 | 0 | 1 | ---- | ---- | ---- |
| | 8 | ---- | ---- | ---- | 0 | 1 | 0 | 1 | 1 | 0 | 0 | 1 | ---- | ---- | ---- |
| | 9 | ---- | ---- | ---- | 1 | 1 | 0 | 1 | 0 | 0 | 0 | 1 | ---- | ---- | ---- |
| | 10 | ---- | ---- | ---- | 1 | 0 | 0 | 1 | ---- | ---- | ---- | ---- | ---- | ---- | ---- |
| | 11 | ---- | ---- | ---- | 0 | 0 | 0 | 1 | ---- | ---- | ---- | ---- | ---- | ---- | ---- |
| Odd | 0—0 | 0 | 0 | 1 | 0 | 0 | 0 | 1 | 0 | 0 | 0 | 1 | ---- | ---- | ---- |
| | 1—⅛ | 1 | 0 | 1 | 1 | 0 | 0 | 1 | 1 | 0 | 0 | 1 | ---- | ---- | ---- |
| | 2—¼ | 1 | 1 | 1 | 1 | 1 | 0 | 1 | 1 | 1 | 0 | 1 | ---- | ---- | ---- |
| | 3—⅜ | 0 | 1 | 1 | 0 | 1 | 0 | 1 | 0 | 1 | 0 | 1 | ---- | ---- | ---- |
| | 4—½ | 0 | 1 | 0 | 0 | 1 | 1 | 1 | 0 | 1 | 1 | 1 | ---- | ---- | ---- |
| | 5—⅝ | 1 | 1 | 0 | 0 | 0 | 1 | 1 | 0 | 1 | 1 | 0 | ---- | ---- | ---- |
| | 6—¾ | 1 | 0 | 0 | 0 | 0 | 1 | 0 | 0 | 1 | 0 | 0 | ---- | ---- | ---- |
| | 7—⅞ | 0 | 0 | 0 | 0 | 1 | 1 | 0 | 1 | 1 | 0 | 0 | ---- | ---- | ---- |
| | 8 | ---- | ---- | ---- | 0 | 1 | 0 | 0 | 1 | 0 | 0 | 0 | ---- | ---- | ---- |
| | 9 | ---- | ---- | ---- | 1 | 1 | 0 | 0 | 0 | 0 | 0 | 0 | ---- | ---- | ---- |
| | 10 | ---- | ---- | ---- | 1 | 0 | 0 | 0 | ---- | ---- | ---- | ---- | ---- | ---- | ---- |
| | 11 | ---- | ---- | ---- | 0 | 0 | 0 | 0 | ---- | ---- | ---- | ---- | ---- | ---- | ---- |

For the inch fractions, inches, and feet an "odd" and an "even" code is used. The table is to be interpreted as follows: the correct fraction is determined by both the fraction and whether the inch increment is odd or even, the numeral 0 being considered to be even. The same interpretation is placed on the inch code, i.e., it depends upon whether the foot increment is odd or even; likewise, the foot code depends on whether the foot times 10 increment is odd or even. There is no odd or even columns for the foot times 10 code because it is not dependent upon another succeeding column. Using this interpretation, the coded liquid levels extending from 50 feet downwardly, in decrements of ⅛ of an inch, is illustrated in Table VIII.

As described above, in connection with Figure 2C, a 24 position scanning commutator 34 is used for sampling the eight positions of the code discs 30 and 32, and that the first, seventh and seventeenth contacts are not used, i.e., left blank. Leaving these contacts blank, however, is purely arbitrary, but there remain 21 active contacts on the scanning commutator.

*Table VIII*

| | Fractions | | | Inches | | | | Foot Units | | | | Feet Tens | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| | K | L | M | N | P | Q | R | T | U | V | W | X | Y | Z |
| 50′—0″ | 0 | 0 | 0 | 0 | 0 | 0 | 0 | 0 | 0 | 0 | 1 | 0 | 0 | 1 |
| 49′—11⅞ | 0 | 0 | 0 | 0 | 0 | 0 | 0 | 0 | 0 | 0 | 1 | 1 | 0 | 1 |
| 49′—11¾ | 1 | 0 | 0 | 0 | 0 | 0 | 0 | 0 | 0 | 0 | 1 | 1 | 0 | 1 |
| 49′—11⅝ | 1 | 1 | 0 | 0 | 0 | 0 | 0 | 0 | 0 | 0 | 1 | 1 | 0 | 1 |
| 49′—11½″ | 0 | 1 | 0 | 0 | 0 | 0 | 0 | 0 | 0 | 0 | 1 | 1 | 0 | 1 |
| 49′—11⅜″ | 0 | 1 | 1 | 0 | 0 | 0 | 0 | 0 | 0 | 0 | 1 | 1 | 0 | 1 |
| 49′—11¼″ | 1 | 1 | 1 | 0 | 0 | 0 | 0 | 0 | 0 | 0 | 1 | 1 | 0 | 1 |
| 49′—11⅛″ | 1 | 0 | 1 | 0 | 0 | 0 | 0 | 0 | 0 | 0 | 1 | 1 | 0 | 1 |
| 49′—11⅛″ | 0 | 0 | 1 | 0 | 0 | 0 | 0 | 0 | 0 | 0 | 1 | 1 | 0 | 1 |
| 49′—10⅞″ | 0 | 0 | 1 | 1 | 0 | 0 | 0 | 0 | 0 | 0 | 1 | 1 | 0 | 1 |
| 49′—10¾ | 1 | 0 | 1 | 1 | 0 | 0 | 0 | 0 | 0 | 0 | 1 | 1 | 0 | 1 |
| 49′—10⅝″ | 1 | 1 | 1 | 1 | 0 | 0 | 0 | 0 | 0 | 0 | 1 | 1 | 0 | 1 |
| 49′—10½″ | 0 | 1 | 1 | 1 | 0 | 0 | 0 | 0 | 0 | 0 | 1 | 1 | 0 | 1 |
| 49′—10⅜″ | 0 | 1 | 0 | 1 | 0 | 0 | 0 | 0 | 0 | 0 | 1 | 1 | 0 | 1 |
| 49′—10¼″ | 1 | 1 | 0 | 1 | 0 | 0 | 0 | 0 | 0 | 0 | 1 | 1 | 0 | 1 |
| 49′—10⅛″ | 1 | 0 | 0 | 1 | 0 | 0 | 0 | 0 | 0 | 0 | 1 | 1 | 0 | 1 |
| 49′—10⅛″ | 0 | 0 | 0 | 1 | 0 | 0 | 0 | 0 | 0 | 0 | 1 | 1 | 0 | 1 |
| 49′—9⅞″ | 0 | 0 | 0 | 1 | 1 | 0 | 0 | 0 | 0 | 0 | 1 | 1 | 0 | 1 |
| 49′—0″ | 0 | 0 | 0 | 0 | 0 | 0 | 1 | 0 | 0 | 0 | 1 | 1 | 0 | 1 |
| 48′—11⅞″ | 0 | 0 | 0 | 0 | 0 | 0 | 1 | 1 | 0 | 0 | 1 | 1 | 0 | 1 |

As described above, the first seven active contacts are used for telemetering the tank number. The second set of seven active contacts are for scanning the inch disc, and the third set of seven active contacts are for scanning the foot discs. It is noted that the apparatus shown in Figure 2C serves to scan the least significant figure first. However, this is not critical in so far as the invention is concerned, since the most significant figure may be scanned first instead of scanning as shown herein, from ⅛ through inches and foot through tens or feet. The various conducting segments on the code discs shown in Figures 7 and 8, of course, are in accordance with the code represented in Table VII; and, of course, the various relay switches illustrated in Figure 2A are interconnected in accordance with the same code.

Referring to Figure 2A, it is observed that there are generally four "Christmas tree" arrangements and that the first three, fractions, inches and feet, are followed by a reiterative network which is controlled by the following information code, and it is in this respect that the odd and even nature of the code, as indicated in Table VII is of importance. It is noted that energization of any one of the code relay windings in Figure 2A and consequent operation of the associated relay switches, represents a "on" condition as represented by the numeral 1 of the code, such energization of the relay, as explained previously, being produced when a dash, as distinguished from a dot, is being received. When a dot is received, a relay is not energized, the relay switches, of course, remain unactivated and thus, the dot is represented by the numeral 0 in the code illustrated in Table VII. It is noted also in Figure 2A that for any given fraction reading, the reading will change in the fraction column when a change is made in any other column following it (any column to the left in the drawing). This is true for one or an odd number of changes; an even number would bring the fractions reading back to where it had been before the change. This appears to be a rather difficult thing to explain but the action is considered important in order to use the type of code used herein without having discontinuity in the sense that there should be a change in only one column for any particular change of ⅛ inch in liquid level, as postulated in more detail hereinafter.

The type of binary coding used herein is considered unique in that three different quantities, i.e., fractions, inches, and feet, measured, respectively, on a base of 8, 12, and 10 are encoded and decoded in such a manner as to avoid any discontinuity of the character indicated above. This type of coding is considered to be important in one aspect in that it allows representative readings to be obtained of the liquid level, under changing level conditions, without requiring the sensing element, i.e., liquid float, to be locked in position. The particular code illustrated in Table VII, for this particular purpose, is in accordance with definite rules which are postulated hereinafter. The first rule is that the code is such that between adjacent numbers, i.e., between adjacent ⅛ inch readings, there is a change in one element only of the number code. The type of code fitting this condition is referred to as a cyclic code. An example of a cyclic code for the numbers 0 through 9 would be:

| | |
|---|---|
| 0 | 0000 |
| 1 | 0001 |
| 2 | 0011 |
| 3 | 0010 |
| 4 | 0110 |
| 5 | 0111 |
| 6 | 0101 |
| 7 | 0100 |
| 8 | 1100 |
| 9 | 1101 |

For a system where the number is to consist of two or more digits it is observed that merely adding additional and "digit code columns" for the higher digit columns will not be satisfactory since at the time of toggle or change between columns there will be a change in more than one code element, and in order that this first rule may not be violated, the code must follow additional rules. For example, using the above code, when increasing from 09 to 10 the code would change thus:

| | | |
|---|---|---|
| 09 | 0000 | 1101 |
| 10 | 0001 | 0000 |

It is noted that this requires a change in four of the code elements in violation of the first rule. This indicates that one of the code column changes or code element changes must effect a change in all of the digit columns and in addition require a "memory" or storage of information during the change. In a counting system that progresses 1 digit at a time in either direction the change of information can be from the least significant column to the more significant column and the memory is inherent, due to the fact that the system is either increasing or decreasing exactly one digit, and a digit being considered to be, for example, an Arabic numeral. For a system where a complete number must be fed in and the number may represent any value within the range of the system, change of information from the least to the more significant figure is not suited. Therefore, to avoid the use of memory or storage apparatus, as is accomplished in the present system, the greater significant figure column should provide the toggle for both itself and the lower digit columns; and this in accordance with rule number 2 for the code. This rule may be demonstrated in connection with Table VIII in which it is observed that a change from 50 feet to 49 feet, 11⅞ inches, is accomplished by a change in the feet tens column, i.e., there is a change from 001 to 101. Likewise, in the change from 49 feet 0 inches to 48 feet, 11⅞ inches, the only change is in the foot units column, namely, a change from 0001 to 1001. In both instances rule 1 is also satisfied in that only one element of the number code is changed, i.e., in the first instance a 0 is changed to a 1 and in the second instance only a 0 is changed to a 1.

The second rule may thus be stated that the single code element change taking place between numbers always takes place in the digit code column for the most significant digit column that is undergoing a change.

To satisfy rule number 2, it is necesary to reconsider the code requirements. Thus, since during a toggle in two or more columns the single code element change must take place in the most significant figure digit code, then during this change there must not be any code change in any other digit code column. Also, since one of the representatives is to provide an arrangement that is capable of accepting the input of any finite number of degrees of rotation of the code discs, the code used for at least the least significant figure must be such that it can be used over or repeat upon itself. This requirement coupled with the other requirement that allows a code element change in only the most significant digit code column indicates that the digit code column making the change must in some manner modify the lower significant code results so that the same output conditions result. This is accomplished in the decoder portion of the system. For that purpose, a reiterative network is connected so that an odd number of conditions produces a reversed connection or condition of the output and an even number of conditions produces an output condition that corresponds to that which existed before the network was introduced. This network thus provides a means of using the reciprocal or reverse condition of the code to allow the same output condition that existed originally. These considerations are the basis for rule number 3 which is stated as follows: Each digit decoder translator circuit, except that for the most significant figure, must be under the control of a reiterative network that is controlled by the more significant digits codes. This rule may be illustrated in connection with Figure 2A, for example, wherein the Z, Y, X, and W relay switches, sensitive to changes in the most significant figure, control the passage of current through those relay switches that are sensitive to the less significant digit code. A fourth rule is that each digit code column, except that for the most significant digit must repeat in the opposite order for each successive repetition. In general, satisfaction of rule 4 serves also as the satisfaction of rule 2 mentioned above since at the time of the change in two or more digit columns there is a change in the code for only the most significant figure. This is true due to the fact that if the codes are to repeat in the opposite or reverse order the last and the first code in a digit code column is identical. This rule perhaps has greater significance from a study of Table VII which shows that in the fractions column the fraction ⅞ and the succeeding fraction 8/8 (corresponding to 0) is represented by the same code, namely, 001. Likewise, a fraction ⅞ as well as the succeeding next fraction 8/8 (corresponding to 0) is represented by the code 000. Further study of Table VII makes clear that the "even" and "odd" series of code numbers in any one particular column are mirror images. For example, 0 (odd) and ⅞ (even) are both represented by the 001; ⅛ (odd) and ¾ (even) are both represented by 101; ¼ (odd) and ⅝ (even) are each represented by 111, etc. The code thus obeys a rule which may be stated as rule number 5, namely, where the encoding device must repeat due to the nature of the input column, an even number of digit code column repetitions must exist in each full cycle or revolution. To satisfy these rules, certain requirements must be met by the apparatus used. Thus, in order for the code to be used in the reverse manner and still produce the same results through the use of a reiterative network, the code must be such that its "symmetrical" about its center line, i.e., the second half of the code must be exactly the reverse of the first half, i.e., a mirror image of the same, as explained above, except for one column.

Another rule may be stated from a study of the Table VII and such rule may be stated as rule 6 as follows: for any given number base N, the digit code column must after N/2 combinations, repeat in the exact reverse order except for one element column. This adds a condition which must exist in order to properly encode a number system. Thus, fractions are represented on a base 8 in which case, the number N is 8. Likewise, inches are expressed on a base of 12 and in this instance the number N is 12.

The seventh rule may be stated as follows: The number base being encoded must be divisible by two for all but the most significant figure. For proper operation of the translator portion of the decoder unit, it is necessary that one code element in each digit code column remain alike for N/2 digits and then for the next N/2 digits the opposite code element must be used.

An eighth rule may be stated from a study of Table VII, namely: For the digit codes representing the digits from 0 to N/2 −1, one element column must have like elements in each code, and for the digits N/2 to N−1 said element column must have opposite elements as used for digits zero to N/2 −1.

A ninth rule may be stated as follows: The number of digits that can be represented by any given number of code elements is: $N=2^n$, where $n$=the number of code elements and N=the number of digits or the numerical base.

For purposes of providing a definition for discussion and for providing a suitable basis for the terminology of the claims the following terms are defined as follows:

An anolog value is a value that can vary in infinitely small steps without discontinuity and that can theoretically range from zero to infinity in one scale or column.

A digital value is a value that can vary only in discrete steps or increments.

A digit is an Arabic numeral.

A number is a group of Arabic numerals, 29, 65, 90, 115, etc.

A code is a group of code elements, with each element having two possible states or values, said code representing each of a finite number of values as a particular arrangement of discrete events.

A digit code is the code representing a digit or Arabic numeral.

A number code is the code, or group of codes, representing a number or group of Arabic numerals.

A digit code column is the complete list of codes for all the digits used according to the numerical base, 8 codes for digits used in a numerical system having a base of 8, 10 codes for the digits used in the decimal system, base 10.

A code element is one of the discrete events in a code.

A code element column is a one element column of a digit code column.

While the particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In a system of the character described, an element movable to different positions, a first coded disc having a plurality of code tracks thereon for indicating the angular position of said disc relative to an initial position, the code in said first coded disc code tracks being in accordance with one number base, a second coded disc having a plurality of code tracks thereon for indicating the angular position of said disc relative to an initial position, the code in said second coded disc being in accordance with a second number base, means coupling said movable element to said coded disc to render it movable therewith, means coupling said first code disc to said second code disc for moving said second code disc an increment of its code number base each time said first code disc has been moved the number of increments in its code number base corresponding to an increment of the code number base of said second coded disc, means for deriving a train of coded pulses from both of said discs representative of their angular positions relative to said initial position, means for receiving said train of coded pulses, and means responsive to said received pulses and to the number of said pulses for decoding said pulses and indicating the angular positions of said coded discs.

2. In a system as recited in claim 1 wherein the number base for said first coded disc code tracks is 12 and the number base for said second coded disc code tracks is 10 and the configuration of both said first and second coded disc codes are in accordance with reflected cyclic codes.

3. In a system as recited in claim 1 wherein the pulses in the train of coded pulses derived by said means for deriving a train of coded pulses from both of said discs includes long and short pulses, and said means responsive to said pulses and to the number of said pulses for decoding said pulses and indicating the angular positions of said coded discs includes a separate decoding relay for each pulse in said train of coded pulses, means responsive to each pulse in said train of coded pulses for successively selecting each of said separate decoding relays, and means responsive to a long pulse for energizing a decoding relay selected by said means for successively selecting each of said separate decoding relays.

4. In a system of the character described, an element movable to different positions, coded disc means coupled to said element to be movable therewith to different angular positions, commutator means for deriving from said coded disc means a train of a predetermined number of long and short pulses representative of the position of said element and means for receiving said train of pulses and developing therefrom an indication of the position of said element, said means for receiving said train of pulses including a plurality of decoding means each of which is associated with a predetermined pulse location in a received train of pulses, means for successively making a connection to each one of said decoding means responsive to a received train of pulses, and means for energizing a decoding means to which a connection is made responsive to a long pulse being present at the associated pulse location.

5. A system as recited in claim 4 wherein said plurality of decoding means comprise a plurality of relays each having a relay coil; said means for successively making a connection to each one of said decoding means responsive to a train of pulses includes a selector switch having movable selector arm and a plurality of terminals each of which is connected to a different one of said relay coils, and means responsive to pulses for successively advancing said selector arm to successively contact said plurality of terminals; and said means for energizing a decoding means responsive to a long pulse being present at the associated pulse location includes a source of relay energizing potential, and means responsive only to long pulses for applying potential from said source to said selector arm.

6. In a system of the character described, an element movable to different positions, a first coded disc having a plurality of code tracks thereon for indicating the angular position of said disc relative to an initial position, the code in said first coded disc code tracks being in accordance with one number base, a second coded disc having a plurality of code tracks thereon for indicating the angular position of said disc relative to an initial position, the code in said second coded disc being in accordance with a second number base, means coupling said movable element to said coded disc to render it movable therewith, means coupling said first coded disc to said second coded disc for moving said second coded disc an increment of its code number base each time said first coded disc has been moved the number of increments in its code number base corresponding to an increment of the code number base of said second coded disc, commutator means for deriving from both of said discs a train of a predetermined number of long and short pulses representative of their angular position relative to said initial position, means for receiving said train of coded pulses and developing therefrom an indication of the position of said element, said means for receiving said train of coded pulses including a plurality of decoding relays, each of which is associated with a different pulse position in said train of coded pulses, means for successively making connection to each of said decoding relays responsive to successive pulses in said train of coded pulses, and means for energizing a decoding relay to which connection is made responsive to the pulse with which that decoding relay is associated being a long pulse.

7. In a system as recited in claim 6 wherein each of said coded discs has a plurality of code tracks thereon in a reflected cyclic binary code configuration, said coded disc tracks further providing different digit code columns for representing different digits of a quantity, each said different digit code columns having a configuration for providing an odd and even series of reflected cyclic binary code for minimizing the change required for representing a change in a quantity having a plurality of digits.

8. In a system as recited in claim 6 wherein said commutator means for deriving from both of said coded discs a train of a predetermined number of long and short pulses representative of their angular position relative to said initial position includes a separate brush over each track on said coded discs, a commutator disc having a plurality of circumferentially disposed contacts, a different one of which is connected to a different brush, a brush, and means for rotating said brush for successively engaging said plurailty of contacts.

9. A liquid level indicating system comprising means for establishing a code representative of said liquid level including a first and a second coded disc, each having a plurality of code tracks thereon for indicating the level of said liquid, the code of said first coded disc tracks being in accordance with one number base, the code of said second coded disc tracks being in accordance with a second number base, means for rotating said first coded disc responsive to said liquid level motion to assume an angular position representative of said liquid level, means coupling said second coded disc for rotating by said first coded disc through one increment of said second number base code when said first coded disc has been rotated through the number of increments of its first number base code equal to one increment of said second number base code, a plurality of brushes, each of which is over a different track of said coded discs, commutator means for successively scanning said plurality of brushes and providing a train of long and short pulses representative of the code sensed by said brushes, means for energizing said commutator means for a single scanning cycle, means for receiving said pulses from said commutator means and for deriving an indication of the liquid level therefrom including a plurality of decoding relays each of which is associated with a different pulse position in a received train of pulses and each having a plurality of contacts, a selector switch having a plurality of terminals and a selector arm, means connecting each one of said decoding relays to a different one of said terminals, means for moving said selector arm to make contact successively with each one of said terminals responsive to said received train of pulses, means responsive to a long pulse to render operative the decoding relay to which said selector arm is connected, and means responsive to the contacts of the operated ones of said relays for indicating said liquid level.

References Cited in the file of this patent

UNITED STATES PATENTS

| | | |
|---|---|---|
| Re. 22,394 | Moore | Nov. 23, 1943 |
| 1,744,220 | Gardner | Jan. 21, 1930 |
| 1,866,327 | Stewart | July 5, 1932 |
| 2,023,221 | Fischer et al. | Dec. 3, 1935 |
| 2,132,213 | Locke | Oct. 4, 1938 |
| 2,207,743 | Larson et al. | July 16, 1940 |
| 2,318,591 | Couffignal | May 11, 1943 |
| 2,386,482 | Leathers et al. | Oct. 9, 1945 |
| 2,557,964 | Herbst | June 26, 1951 |
| 2,571,680 | Carbrey | Oct. 16, 1951 |
| 2,679,644 | Lippel | May 25, 1954 |
| 2,680,240 | Greenfield | June 1, 1954 |
| 2,685,054 | Brenner | July 27, 1954 |

OTHER REFERENCES

A.I.E.E Transactions, vol. 72, 1953, Pt. I, Communications and Electronics, p. 567–571.

Control Engineering, March 1957, vol. 4, issue 3, p. 87–91.